United States Patent
Kazuno et al.

(10) Patent No.: US 11,214,876 B2
(45) Date of Patent: Jan. 4, 2022

(54) HYDROGEN PRODUCTION APPARATUS

(71) Applicant: HONDA MOTOR CO., LTD., Tokyo (JP)

(72) Inventors: Shuichi Kazuno, Wako (JP); Daisuke Misu, Wako (JP); Masahiro Mohri, Wako (JP); Hisashi Nagaoka, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 385 days.

(21) Appl. No.: 16/502,064

(22) Filed: Jul. 3, 2019

(65) Prior Publication Data
US 2020/0010961 A1   Jan. 9, 2020

(30) Foreign Application Priority Data
Jul. 5, 2018  (JP) .............................. JP2018-127992

(51) Int. Cl.
| | |
|---|---|
| *C25B 9/19* | (2021.01) |
| *C25B 15/08* | (2006.01) |
| *C25B 1/04* | (2021.01) |
| *C25B 9/65* | (2021.01) |
| *C25B 9/70* | (2021.01) |
| *F17C 13/12* | (2006.01) |
| *H05K 5/02* | (2006.01) |

(52) U.S. Cl.
CPC ................. *C25B 1/04* (2013.01); *C25B 9/65* (2021.01); *C25B 9/70* (2021.01); *F17C 13/12* (2013.01); *F17C 2221/012* (2013.01); *F17C 2260/042* (2013.01); *F17C 2270/05* (2013.01); *H05K 5/0213* (2013.01)

(58) Field of Classification Search
CPC .. C25B 1/04; C25B 9/19; C25B 15/08; C25B 15/00; C25B 15/02; C25B 9/00; C25B 9/70; C25B 1/00; C25B 1/02; C25B 9/17; C25B 3/25; C25B 9/40
See application file for complete search history.

(56) References Cited

U.S. PATENT DOCUMENTS

| | | | |
|---|---|---|---|
| 2003/0148171 A1* | 8/2003 | Mitlitsky | .......... H01M 8/04059 |
| | | | 429/53 |
| 2011/0240486 A1 | 10/2011 | Yoshida et al. | |
| 2016/0068976 A1* | 3/2016 | Yoshida | .................... C25B 9/19 |
| | | | 204/265 |

FOREIGN PATENT DOCUMENTS

JP        2011-225964        11/2011

* cited by examiner

*Primary Examiner* — Zulmariam Mendez
(74) *Attorney, Agent, or Firm* — Amin, Turocy & Watson, LLP (57) ABSTRACT

A hydrogen production apparatus includes a water electrolysis unit, a storage unit, a supply unit, and an electrical equipment unit. A first ventilation flow path causes air to flow through an electrical equipment chamber and a storage chamber, which is formed by at least one of a water electrolysis chamber, a storage chamber, and a supply chamber. A second ventilation flow path causes air to flow through at least one of the water electrolysis chamber, the storage chamber, and the supply chamber that is not the storage chamber. The electrical equipment chamber is positioned farthest upstream in the first ventilation flow path, and the first ventilation flow path and the second ventilation flow path are separated from each other.

13 Claims, 5 Drawing Sheets

HYDROGEN PRODUCTION APPARATUS

CROSS-REFERENCE TO RELATED APPLICATION

This application is based upon and claims the benefit of priority from Japanese Patent Application No. 2018-127992 filed on Jul. 5, 2018, the contents of which are incorporated herein by reference.

BACKGROUND OF THE INVENTION

Field of the Invention

The present invention relates to a hydrogen production apparatus including a water electrolysis apparatus that electrolyzes water to generate hydrogen gas.

Description of the Related Art

Japanese Laid-Open Patent Publication No. 2011-225964 discloses a case in which are formed a storage chamber that houses a water electrolysis apparatus and the like and an electrical equipment chamber that is distanced from the storage chamber. A first fan for taking air into the electrical equipment chamber, an exhaust port for discharging the air in the electrical equipment chamber to the outside, a pipe member for guiding the air in the electrical equipment chamber to the storage chamber, and a second fan for discharging the air in the storage chamber to the outside are provided in the case.

Furthermore, a first ventilation flow path causing air to flow from the first fan to the exhaust port through the electrical equipment chamber and a second ventilation flow path causing the air to flow from the first fan to the second fan through the electrical equipment chamber, the pipe member, and the storage chamber are provided in the case.

SUMMARY OF THE INVENTION

With the conventional art described above, it is necessary to form the storage chamber and the electrical equipment chamber inside the case and to provide the pipe member inside the case, and therefore there is a concern that the configuration inside the case will become complicated and the cost will increase.

The present invention aims to solve the above problem, and it is an objective of the present invention to provide a hydrogen production apparatus that can prevent the flow of hydrogen into the electrical equipment chamber with a simple and low-cost configuration.

One aspect of the present invention is a hydrogen production apparatus comprising a water electrolysis unit including a water electrolysis apparatus configured to electrolyze water to generate hydrogen gas and a water electrolysis housing section that forms a water electrolysis chamber in which the water electrolysis apparatus is housed; a storage unit including a storage apparatus configured to store the hydrogen gas generated by the water electrolysis apparatus and a storage housing section that forms a storage chamber in which the storage apparatus is housed; a supply unit including a supply apparatus configured to supply the hydrogen gas stored in the storage apparatus to outside and a supply housing section that forms a supply chamber in which the supply apparatus is housed; an electrical equipment unit including an electrical equipment apparatus configured to control at least the water electrolysis apparatus and an electrical equipment housing section that forms an electrical equipment chamber in which the electrical equipment apparatus is housed; a first ventilation flow path configured to cause air to flow through the electrical equipment chamber and a housing chamber, which is formed by at least one of the water electrolysis chamber, the storage chamber, and the supply chamber; and a second ventilation flow path configured to cause air to flow through at least one of the water electrolysis chamber, the storage chamber, and the supply chamber that is not part of the housing chamber, wherein the electrical equipment chamber is positioned farthest upstream in the first ventilation flow path, and the first ventilation flow path and the second ventilation flow path are separated from each other.

According to the present inventions, since the water electrolysis apparatus, the storage apparatus, the supply apparatus, and the electrical equipment apparatus are each formed as a unit, the configuration of the hydrogen production apparatus can be simplified. Furthermore, since the electrical equipment chamber is positioned farthest upstream in the first ventilation flow path, even when hydrogen gas leaks into the first ventilation flow path, it is possible to prevent the leaked hydrogen gas from flowing into the electrical equipment chamber. Yet further, since the first ventilation flow path and the second ventilation flow path are separated from each other, even when hydrogen gas leaks into the second ventilation flow path, it is possible to prevent the leaked hydrogen gas from flowing into the electrical equipment chamber of the first ventilation flow path. Accordingly, it is possible to prevent hydrogen gas from flowing into the electrical equipment chamber, with a simple and low-cost configuration.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The following describes examples of preferred embodiments of the present invention, while referencing the accompanying drawings.

Figure 1:
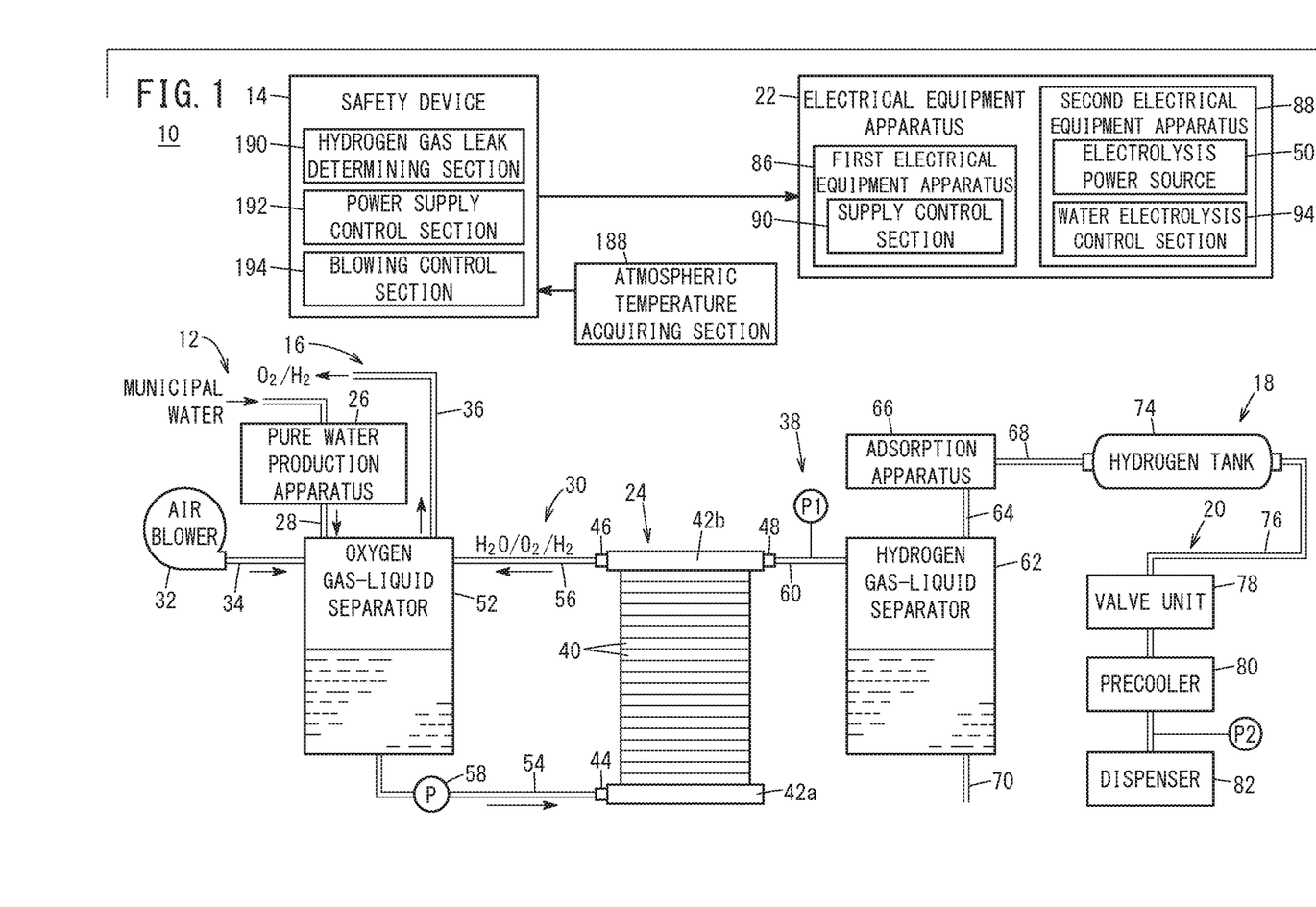
FIG. 1 is a schematic configurational view of a hydrogen production apparatus according to an embodiment of the present invention.

As shown in FIG. 1, a hydrogen production apparatus 10 according to an embodiment of the present invention is configured as a so-called hydrogen gas station, and includes a water electrolysis system 12 and a safety device 14 that controls the water electrolysis system 12. The water electrolysis system 12 includes a water electrolysis apparatus 16, a storage apparatus 18, a supply apparatus 20, and an electrical equipment apparatus 22.

The water electrolysis apparatus 16 includes a water electrolysis stack 24, a pure water production apparatus 26, a pure water supply path 28, a water circulation circuit 30, an air blower 32, an air supply path 34, an air exhaust path 36, and a hydrogen gas outlet portion 38.

The water electrolysis stack 24 produces oxygen and high-pressure hydrogen gas (higher pressure than normal oxygen pressure, e.g. hydrogen gas at 1 MPa to 80 MPa), by electrolyzing water (pure water). The water electrolysis stack 24 is a plurality of water electrolysis cells 40 that are stacked, and end plates 42a and 42b are provided at respective ends in the stacking direction of the water electrolysis cells 40.

The end plate 42a is provided with a water inlet portion 44 in communication with an anode inlet side (water supply inlet side) of each water electrolysis cell 40. The end plate 42b is provided with a water outlet portion 46 in communication with an anode outlet side (water and generated oxygen discharge side) of each water electrolysis cell 40 and with a hydrogen gas outlet portion 48 in communication with a cathode side (high-pressure hydrogen gas generation side) of each water electrolysis cell 40. An electrolysis power source 50 that is a DC power source is connected to the water electrolysis stack 24.

The pure water production apparatus 26 produces pure water from municipal water. The pure water supply path 28 guides the pure water produced by the pure water production apparatus 26 to the water circulation circuit 30. The water circulation circuit 30 includes an oxygen gas-liquid separator 52, a water inflow path 54, a water discharge path 56, and a circulation pump 58. The pure water supply path 28 is connected to an upper portion of the oxygen gas-liquid separator 52. The oxygen gas-liquid separator 52 functions as a tank that stores water.

The water inflow path 54 connects a floor portion of the oxygen gas-liquid separator 52 and the water inlet portion 44 to each other. The water inflow path 54 guides the water stored in the oxygen gas-liquid separator 52 to the water inlet portion 44. The water discharge path 56 connects the water outlet portion 46 and the upper portion of the oxygen gas-liquid separator 52 to each other. The water discharge path 56 guides a mixed fluid, resulting from the mixing of unreacted water that has not been electrolyzed, oxygen generated by the reaction, and hydrogen gas that has permeated from the cathode side to the anode side, to the oxygen gas-liquid separator 52. The oxygen gas-liquid separator 52 separates the mixed fluid into a liquid and a gas (oxygen and hydrogen gas).

The circulation pump 58 is provided in the water inflow path 54. The circulation pump 58 supplies the water stored in the oxygen gas-liquid separator 52 to the inside of the water electrolysis stack 24, from the water inlet portion 44. The air blower 32 guides air used for dilution into the oxygen gas-liquid separator 52, via the air supply path 34. The air supply path 34 and the air exhaust path 36 are connected to the upper portion of the oxygen gas-liquid separator 52. The oxygen and hydrogen gas inside the oxygen gas-liquid separator 52 is discharged to the air exhaust path 36, along with the air guided by the air blower 32.

The hydrogen gas outlet portion 38 includes a first hydrogen gas outlet path 60, a hydrogen gas-liquid separator 62, a second hydrogen gas outlet path 64, an adsorption apparatus 66, and a third hydrogen gas outlet path 68.

The first hydrogen gas outlet path 60 connects the hydrogen gas outlet portion 48 and the upper portion of the hydrogen gas-liquid separator 62 to each other. The hydrogen gas and water generated by the water electrolysis stack 24 flow through the first hydrogen gas outlet path 60. The hydrogen gas-liquid separator 62 separates the fluid guided from the hydrogen gas outlet portion 38 into hydrogen gas and water. A drain flow path 70 is connected to the floor portion of the hydrogen gas-liquid separator 62.

The second hydrogen gas outlet path 64 connects the upper portion of the hydrogen gas-liquid separator 62 and the adsorption apparatus 66 to each other. The hydrogen gas resulting from the separation by the hydrogen gas-liquid separator 62 flows through the second hydrogen gas outlet path 64. The adsorption apparatus 66 includes an adsorption tower filled with a moisture adsorbent that adsorbs the water vapor (moisture) contained in the hydrogen gas using a physical adsorption effect and is regenerated by releasing the moisture to the outside. The third hydrogen gas outlet path 68 guides the hydrogen gas from which the moisture has been removed by the adsorption apparatus 66 to the storage apparatus 18.

The hydrogen gas outlet portion 38 is provided with a first hydrogen pressure acquiring section (hydrogen pressure sensor) P1 that detects the pressure of the hydrogen gas in the water electrolysis apparatus 16. In the present embodiment, the first hydrogen pressure acquiring section P1 is provided in the first hydrogen gas outlet path 60. However, the position where the first hydrogen pressure acquiring section P1 is installed can be set arbitrarily, and the first hydrogen pressure acquiring section P1 may be provided in the second hydrogen gas outlet path 64 or the third hydrogen gas outlet path 68, for example.

The storage apparatus 18 stores the hydrogen gas generated by the water electrolysis apparatus 16. The storage apparatus 18 includes a hydrogen tank 74 connected to the third hydrogen gas outlet path 68. The hydrogen tank 74 is a pressure container in which the high-pressure hydrogen gas is accumulated. A plurality of the hydrogen tanks 74 may be provided.

The supply apparatus 20 supplies the hydrogen gas stored in the storage apparatus 18 to an external apparatus (e.g. a fuel cell electric vehicle) that is not shown in the drawings. The supply apparatus 20 includes a hydrogen gas supply path 76, a valve unit 78, a precooler (cooling unit) 80, and a dispenser (filling unit) 82.

The hydrogen gas supply path 76 is a flow path for guiding the high-pressure hydrogen gas stored in the hydrogen tank 74 to the outside. The valve unit 78 is provided in the hydrogen gas supply path 76. The valve unit 78 includes a plurality of valves (e.g. a check valve, relief valve, pressure adjusting valve, and the like).

The precooler 80 is provided downstream from the valve unit 78 in the hydrogen gas supply path 76. The precooler 80 cools the hydrogen gas that has been guided thereto from the hydrogen tank 74. The dispenser 82 is provided downstream from the precooler 80 in the hydrogen gas supply path 76. The dispenser 82 includes a nozzle (not shown in the drawings) capable of being attached to and detached from an external apparatus (not shown in the drawings).

The supply apparatus 20 is provided with a second hydrogen pressure acquiring section (hydrogen pressure sensor) P2 that detects the pressure of the hydrogen gas in the supply apparatus 20. In the present embodiment, the second hydrogen pressure acquiring section P2 is provided in a region between the precooler 80 and the dispenser 82 in the hydrogen gas supply path 76. However, the position where the second hydrogen pressure acquiring section P2 is installed can be set arbitrarily, and the second hydrogen pressure acquiring section P2 may be provided in a region between the storage apparatus 18 and the valve unit 78 in the hydrogen gas supply path 76 or in a region between the valve unit 78 and the precooler 80 in the hydrogen gas supply path 76, for example.

The electrical equipment apparatus 22 includes a first electrical equipment apparatus 86 and a second electrical equipment apparatus 88. The first electrical equipment apparatus 86 includes a supply control section 90 that controls the driving of the supply apparatus 20. The second electrical equipment apparatus 88 includes the electrolysis power source 50 that is electrically connected to the water electrolysis stack 24 and a water electrolysis control section 94 that controls the driving of the water electrolysis apparatus 16 (the air blower 32, circulation pump 58, and the like).

As shown in FIGS. 2 to 5, the water electrolysis system 12 is formed by joining together (assembling) an electrical equipment unit 96, a water electrolysis unit 98, a storage unit 100, and a supply unit 102. For the sake of convenience, FIG. 3 omits the part of the outer side wall portion and the top wall portion of the water electrolysis system 12. The water electrolysis system 12 extends in one direction (X-arrow direction).

Figure 3:
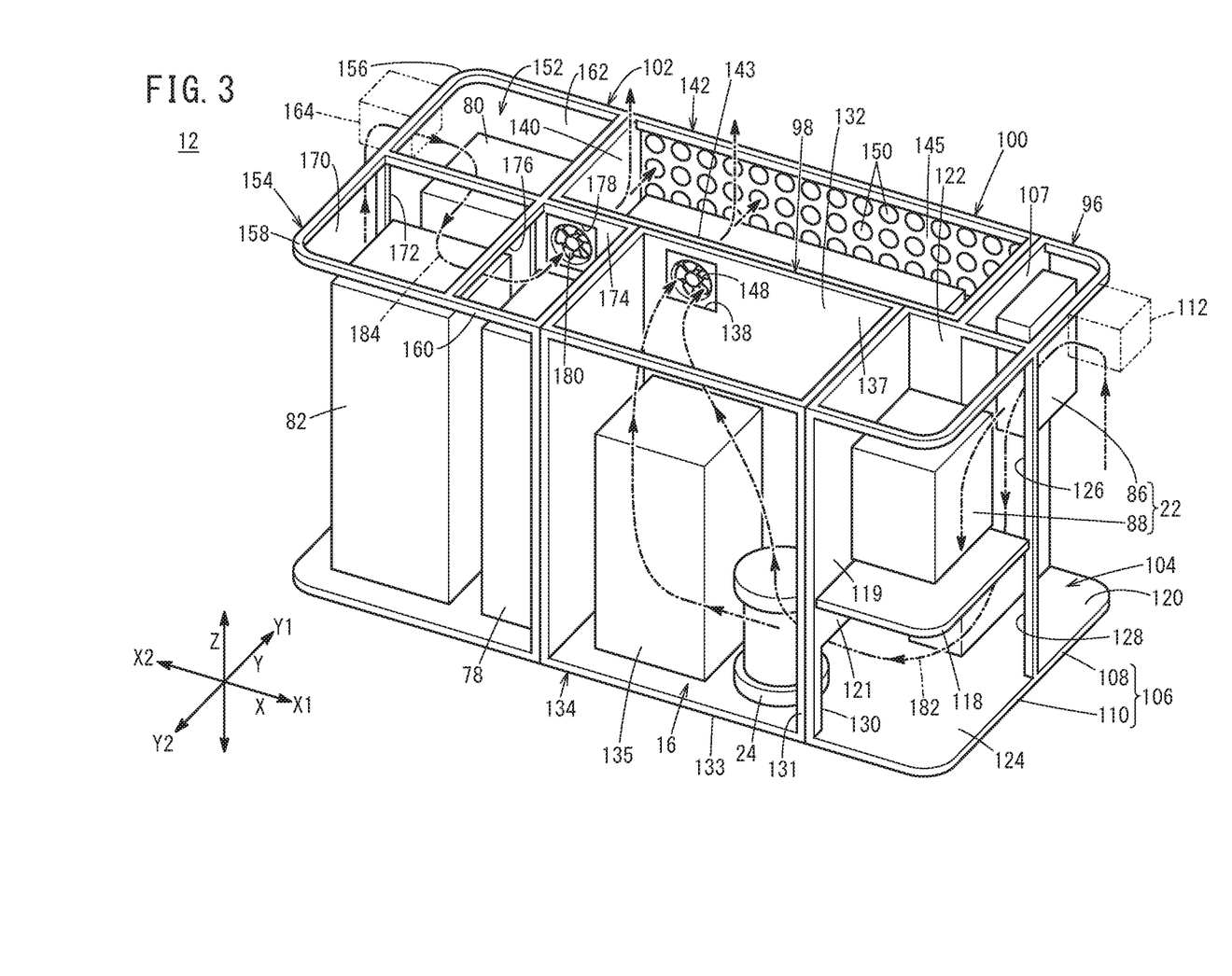
FIG. 3 is a perspective view of the water electrolysis system with a portion thereof omitted.
Figure 4:
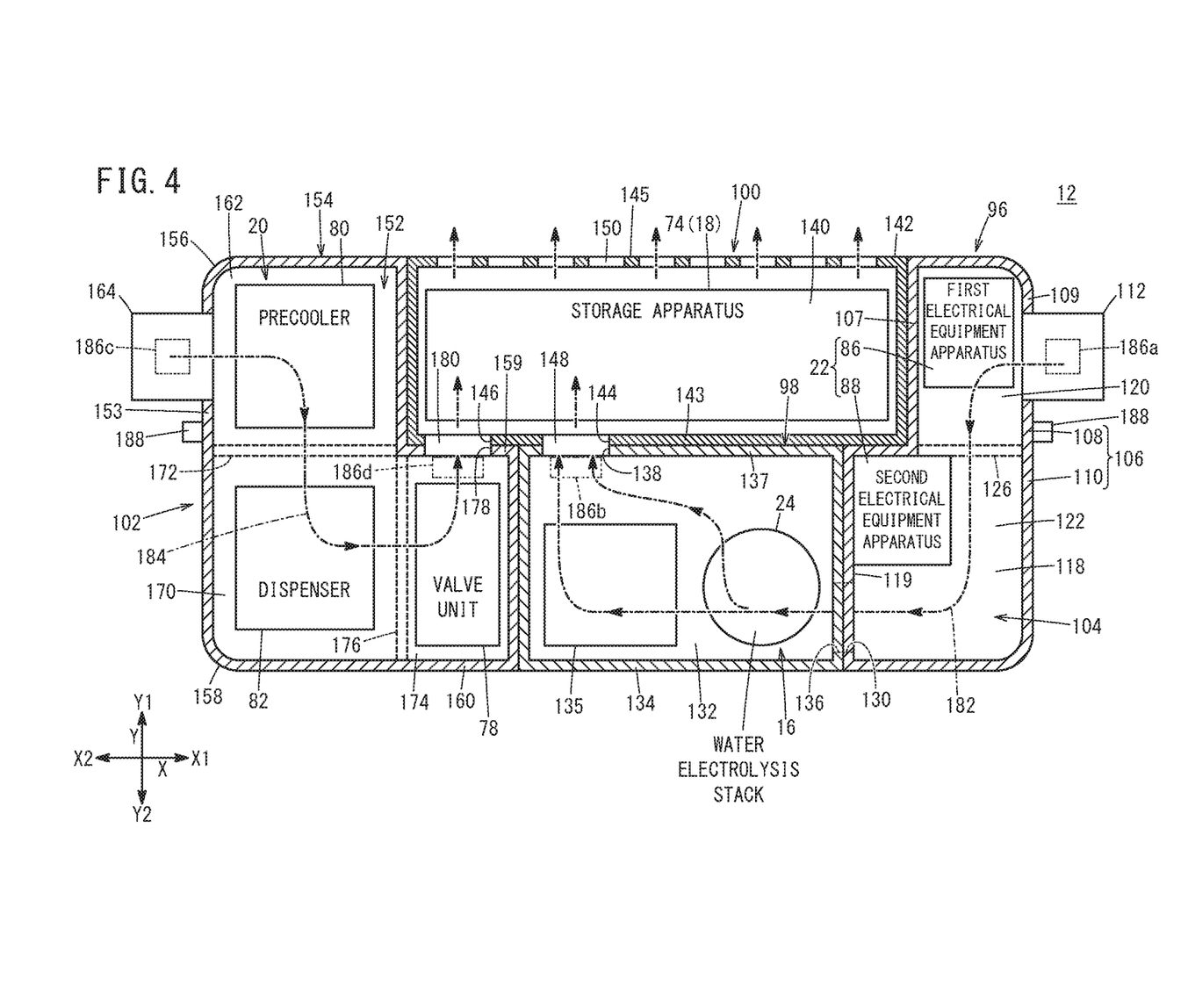
FIG. 4 is a schematic horizontal cross-sectional view of the water electrolysis system.
Figure 5:
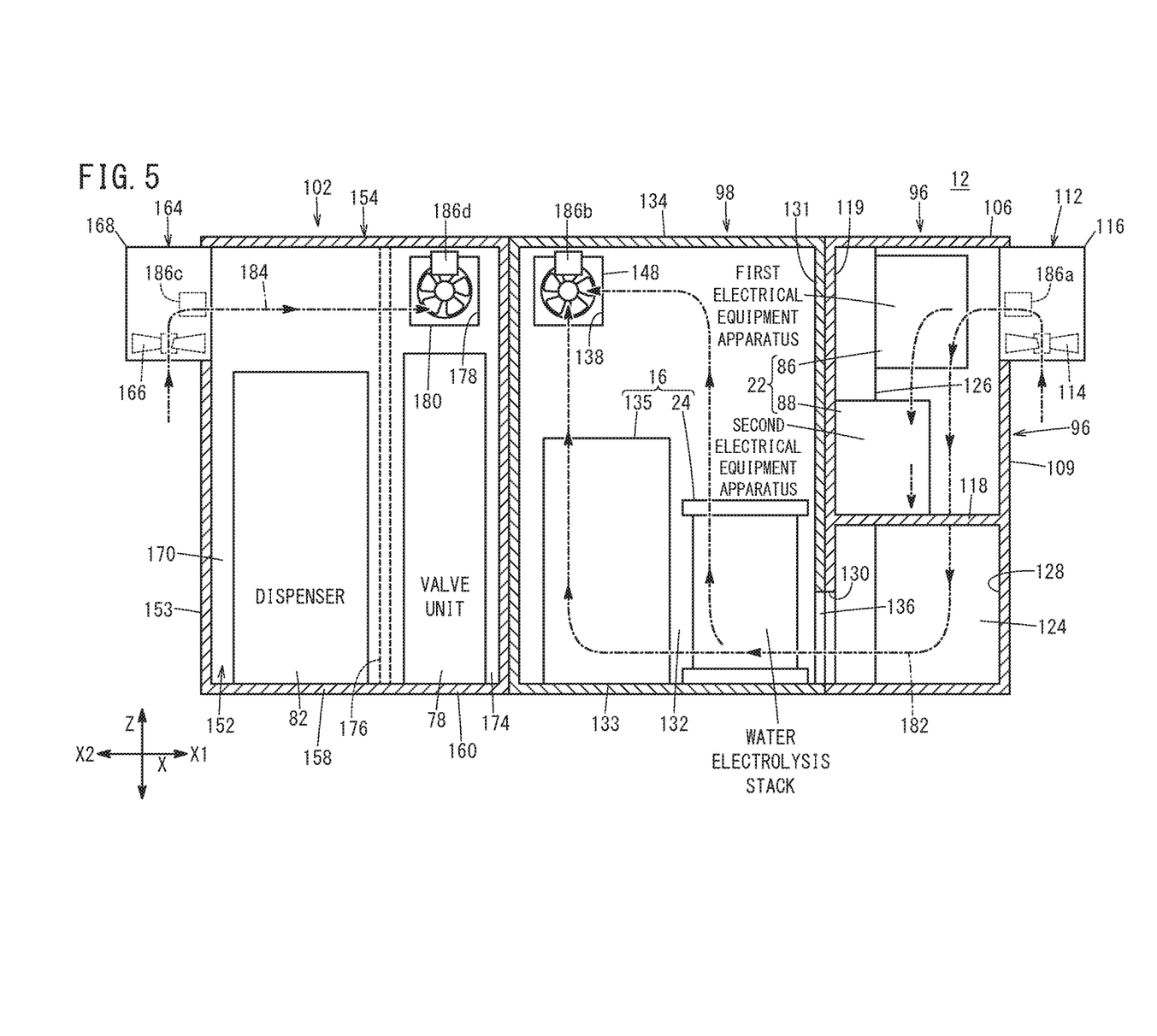
FIG. 5 is a schematic vertical cross-sectional view of the water electrolysis system.

The electrical equipment unit 96 is positioned at one end (end in the X1-arrow direction) of the water electrolysis system 12. In FIGS. 3 to 5, the electrical equipment unit 96 includes the electrical equipment apparatus 22 (first electrical equipment apparatus 86 and second electrical equipment apparatus 88) and an electrical equipment housing section 106 that forms an electrical equipment chamber 104 in which the electrical equipment apparatus 22 is housed. The electrical equipment housing section 106 is formed by integrally connecting a first electrical equipment housing section 108 that houses the first electrical equipment apparatus 86 and a second electrical equipment housing section 110 that houses the second electrical equipment apparatus 88.

The first electrical equipment housing section 108 and the second electrical equipment housing section 110 are arranged in the transverse direction (Y-arrow direction) of the water electrolysis system 12. The first electrical equipment housing section 108 is formed with a rectangular parallelepiped shape, and extends in the up-down direction (Z-arrow direction). The first electrical equipment apparatus 86 is fixed to the inner wall of a side wall portion 107, which is a portion of the first electrical equipment housing section 108 positioned at the other end (X2-arrow direction side) of the water electrolysis system 12.

A first air intake portion 112 for bringing air (outside atmosphere) used for ventilation into the electrical equipment chamber 104 is provided at the upper end of a side wall portion 109 (see FIGS. 2, 4, and 5), which is a portion of the first electrical equipment housing section 108 positioned on the X1-arrow direction side. In FIG. 5, the first air intake portion 112 includes a first inlet blowing section 114 and a first cover 116 that covers the first inlet blowing section 114. The first inlet blowing section 114 is formed as a blowing fan, for example. However, the first inlet blowing section 114 may be any component as long as it is capable of bringing air into the electrical equipment chamber 104 from outside. The first cover 116 covers the first inlet blowing section 114 from above and from the sides, while leaving the first inlet blowing section 114 open towards the bottom.

As shown in FIGS. 3 to 5, the second electrical equipment housing section 110 is formed with a rectangular parallelepiped shape, and extends in the up-down direction. The dimension of the second electrical equipment housing section 110 in the up-down direction is the same as the dimension of the first electrical equipment housing section 108 in the up-down direction. The dimension of the second electrical equipment housing section 110 in the X-arrow direction is greater than the dimension of the first electrical equipment housing section 108 in the X-arrow direction.

The second electrical equipment housing section 110 includes a separating wall 118 that separates the second electrical equipment housing section 110 through the center in the up-down direction. In other words, the electrical equipment chamber 104 includes a first space 120 surrounded by the first electrical equipment housing section 108, a second space 122 surrounded by the top portion of the second electrical equipment housing section 110 and the separating wall 118, and a third space 124 surrounded by the bottom portion of the second electrical equipment housing section 110 and the separating wall 118. The second electrical equipment apparatus 88 is arranged in the second space 122. Specifically, the second electrical equipment apparatus 88 is secured to the inner surface of a side wall portion 119, which is a portion of the second electrical equipment housing section 110 that is positioned on the X2-arrow direction side and forms the second space 122. However, the second electrical equipment apparatus 88 may instead be secured to the top surface of the separating wall 118.

An upper side opening 126 that causes the first space 120 and the second space 122 to be in communication with each other and a bottom-side opening 128 (see FIGS. 3 and 5) that causes the first space 120 and the third space 124 to be in communication with each other, are formed at the boundary portion between the first electrical equipment housing section 108 and the second electrical equipment housing section 110. An air outlet 130 is formed in a side wall portion 121 (lower portion of the second electrical equipment housing section 110), which is a portion of the second electrical equipment housing section 110 that is positioned on the X2-arrow direction side and forms the third space 124.

As shown in FIGS. 3 to 5, the water electrolysis unit 98 is arranged to be adjacent to the other end (X2-arrow direction end) of the water electrolysis system 12 relative to the second electrical equipment housing section 110. The water electrolysis unit 98 includes the water electrolysis apparatus 16 and a water electrolysis housing section 134 that forms a water electrolysis chamber (storage chamber) 132 in which the water electrolysis apparatus 16 is housed.

The water electrolysis housing section 134 is formed with a rectangular parallelepiped shape, and extends in the up-down direction. An air inlet 136 in communication with the air outlet 130 is formed in the lower portion of a side wall portion 131, which is a portion of the water electrolysis housing section 134 positioned on the X1-arrow direction side. Therefore, the third space 124 (electrical equipment chamber 104) is in communication with the water electrolysis chamber 132, via the air outlet 130 and the air inlet 136.

The water electrolysis apparatus 16 is installed on a bottom wall portion 133 (see FIGS. 3 and 5) of the water electrolysis housing section 134. Specifically, the water electrolysis stack 24 of the water electrolysis apparatus 16 is arranged facing the air inlet 136. A portion 135 (the pure water production apparatus 26 and the like) of the water electrolysis apparatus 16 other than the water electrolysis stack 24 is arranged to be adjacent to the water electrolysis stack 24 in the X2-arrow direction. A first opening 138 is formed at an upper end of a side wall portion 137, which is a portion of the water electrolysis housing section 134 positioned on the first electrical equipment housing section 108 side (Y1-arrow direction side).

In FIGS. 3 and 4, the storage unit 100 is arranged adjacent to the first electrical equipment housing section 108 in the X2-arrow direction. In other words, the storage unit 100 is arranged adjacent to the water electrolysis unit 98 in the Y1-arrow direction. The storage unit 100 includes the storage apparatus 18 and a storage housing section 142 forming a storage chamber (merging chamber) 140 in which the storage apparatus 18 is housed.

The storage housing section 142 is formed with a rectangular parallelepiped shape and extends in the up-down direction and the X-arrow direction. One end surface of the storage housing section 142 in the X-arrow direction is covered with the electrical equipment housing section 106 (first electrical equipment housing section 108). The side surface (one side surface pointing in a direction orthogonal to the up-down direction and the longitudinal direction of the storage housing section 142) of the storage housing section 142 in the Y2-arrow direction is covered with the water electrolysis housing section 134.

The hydrogen tank 74 of the storage apparatus 18 is arranged in the storage chamber 140, in a manner to extend in the X-arrow direction. As shown in FIG. 4, a second opening 144 and a third opening 146 are formed at an upper end of a side wall portion 143, which is a portion of the storage housing section 142 positioned on the water electrolysis unit 98 side (Y2-arrow direction side).

The second opening 144 is in communication with the first opening 138 formed in the water electrolysis housing section 134. A first outlet blowing section (first intake portion) 148 for guiding the air in the water electrolysis chamber 132 into the storage chamber 140 is provided in the first opening 138 and the second opening 144. The first outlet blowing section 148 is formed as a blowing fan, for example. However, the first outlet blowing section 148 may be any component as long as it is capable of bringing the air in the electrical equipment chamber 104 into the storage chamber 140. The third opening 146 is provided at a distance from the second opening 144 in the X2-arrow direction.

Figure 2:
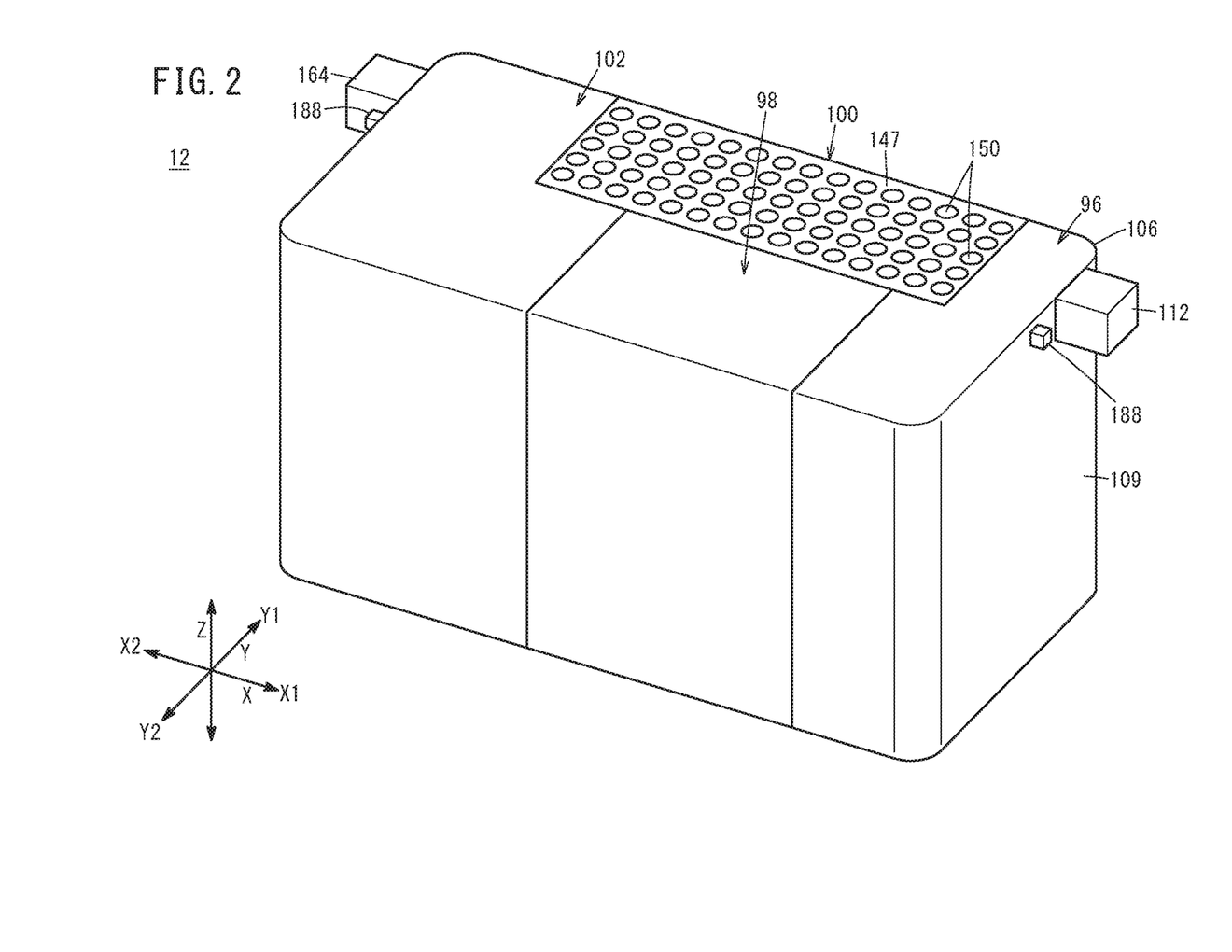
FIG. 2 is a perspective view of a water electrolysis system.

In FIGS. 2 to 4, a side wall portion 145, which is a portion of the storage housing section 142 positioned on the Y1-arrow direction side, and a top wall portion 147 each have a plurality of communication holes 150 formed across the entire surfaces thereof. The side wall portion 145 and the top wall portion 147 are each formed as so-called punched metal. However, the side wall portion 145 and the top wall portion 147 are not limited to being punched metal, and may each be plate-shaped portions formed of mesh, plate-shaped portions with slits formed therein, or the like. Furthermore, the communication holes 150 may be provided in only a portion of the side wall portion 145 or in only a portion of the top wall portion 147. Yet further, it is acceptable for the communication holes 150 to be provided in only one of the side wall portion 145 and the top wall portion 147.

As shown in FIGS. 3 to 5, the supply unit 102 is positioned at the other end (end in the X2-arrow direction) of the water electrolysis system 12. The supply unit 102 includes the supply apparatus 20 (valve unit 78, precooler 80, dispenser 82, and the like) and a supply housing section 154 forming a supply chamber 152 in which the supply apparatus 20 is housed. The supply housing section 154 includes a first supply housing section 156 in which the precooler 80 is housed (see FIGS. 3 and 4), a second supply housing section 158 in which the dispenser 82 is housed, and a third supply housing section 160 in which the valve unit 78 is housed.

The first supply housing section 156 is positioned on the X2-arrow direction side of the storage unit 100. That is, the storage unit 100 is sandwiched between the first electrical equipment housing section 108 and the first supply housing section 156 in the X-arrow direction. The second supply housing section 158 is positioned on the Y2-arrow direction side of the first supply housing section 156. The third supply housing section 160 is positioned on the X1-arrow direction side of the second supply housing section 158. In other words, the third supply housing section 160 is positioned on the X2-arrow direction side of the water electrolysis unit 98 and the Y2-arrow side of the storage unit 100.

In FIGS. 3 and 4, the first supply housing section 156 is formed with a rectangular parallelepiped shape and extends in the up-down direction. The first supply housing section 156 forms a first housing space 162 in which the precooler 80 is housed.

As shown in FIGS. 2 and 5, a second air intake portion 164 for bringing air (outside atmosphere) used for ventilation into the supply chamber 152 is formed at an upper end of a side wall portion 153, which is a portion of the first supply housing section 156 positioned on the X2-arrow direction side. In FIG. 5, the second air intake portion 164 includes a second inlet blowing section 166 and a second cover 168 that covers the second inlet blowing section 166. The second inlet blowing section 166 is formed as a blowing fan, for example. However, the second inlet blowing section 166 may be any component as long as it is capable of bringing air from the outside into the supply chamber 152. The second cover 168 covers the second inlet blowing section 166 from the sides and from above, while leaving the bottom open.

As shown in FIGS. 3 to 5, the second supply housing section 158 is formed with a rectangular parallelepiped shape, and extends in the up-down direction. The dimension of the second supply housing section 158 in the up-down direction is the same as the dimension of the first supply housing section 156 in the up-down direction. The second supply housing section 158 forms a second housing space 170 in which the dispenser 82 is housed.

The boundary portion between the first supply housing section 156 and the second supply housing section 158 is formed with a frame shape. In other words, a first through-hole 172 causing the first housing space 162 and the second housing space 170 to be in communication with each other is formed at the boundary portion between the first supply housing section 156 and the second supply housing section 158.

The third supply housing section 160 is formed with a rectangular parallelepiped shape, and extends in the up-down direction. The dimension of the third supply housing section 160 in the up-down direction is the same as the dimensions of the first supply housing section 156 and the second supply housing section 158 in the up-down direction. The third supply housing section 160 forms a third housing space 174 in which the valve unit 78 is housed.

The boundary portion between the second supply housing section 158 and the third supply housing section 160 is formed with a frame shape. In other words, a second through-hole 176 causing the second housing space 170 and the third housing space 174 to be in communication with each other is formed at the boundary portion between the second supply housing section 158 and the third supply housing section 160. That is, the supply housing section 154 forms a single space (supply chamber 152) in which the first housing space 162, the second housing space 170, and the third housing space 174 are in communication.

A fourth opening 178 is formed at the upper end of a side wall portion 159, which is the portion of the third supply housing section 160 positioned on the Y1-arrow direction side. In FIG. 4, the fourth opening 178 is in communication with the third opening 146 formed in the storage housing section 142. A second outlet blowing section (second intake portion) 180 for guiding the air in the supply chamber 152 (third housing space 174) into the storage chamber 140 is provided in the third opening 146 and the fourth opening 178. The second outlet blowing section 180 is formed as a blowing fan, for example. However, the second outlet blowing section 180 may be any component as long as it is capable of bringing the air in the supply chamber 152 into the storage chamber 140.

As shown in FIGS. 3 to 5, this water electrolysis system 12 includes a first ventilation flow path 182 causing air to flow from the first air intake portion 112 to the storage chamber 140 via the electrical equipment chamber 104 and the water electrolysis chamber 132, and a second ventilation flow path 184 that causes air to flow from the second air intake portion 164 to the storage chamber 140 via the supply chamber 152.

Specifically, the first ventilation flow path 182 is a flow path causing air to flow from the first inlet blowing section 114 to the storage chamber 140, via the first space 120, the bottom-side opening 128, the third space 124, the air outlet 130, the air inlet 136, the water electrolysis chamber 132, and the first outlet blowing section 148. The first ventilation flow path 182 is formed such that air flows in only one direction. The electrical equipment chamber 104 is provided at a position farthest upstream in the first ventilation flow path 182.

The second ventilation flow path 184 is a flow path causing air to flow from the second inlet blowing section 166 to the storage chamber 140, via the first housing space 162, the first through-hole 172, the second housing space 170, the second through-hole 176, the third housing space 174, and the second outlet blowing section 180. The second ventilation flow path 184 is formed such that air flows in only one direction. The first ventilation flow path 182 and the second ventilation flow path 184 are separated from each other.

In other words, two routes for ventilation flow paths are set in the hydrogen production apparatus 10. In the first ventilation flow path 182, the air flows from the electrical equipment chamber 104 that houses the electrical equipment apparatus 22, which can cause fire, toward the chamber (water electrolysis chamber 132) in which the equipment relating to hydrogen gas devices (devices handling hydrogen gas) are housed. At this time, the separating wall 118 functions as a windbreak board that stops the flow through the first ventilation flow path 182. Therefore, it is possible to keep the electrical equipment chamber 104 at a suitable temperature. In the second ventilation flow path 184, the air flows only through the chamber (supply chamber 152) in which the equipment relating to the hydrogen gas devices is housed, and does not flow to the electrical equipment chamber 104 housing the electrical equipment apparatus 22 that can cause fire.

In FIGS. 4 and 5, the water electrolysis system 12 includes a first hydrogen gas sensor 186a, a second hydrogen gas sensor 186b, a third hydrogen gas sensor 186c, and a fourth hydrogen gas sensor 186d. The first hydrogen gas sensor 186a and the second hydrogen gas sensor 186b are used to detect hydrogen gas that has leaked into the first ventilation flow path 182.

The first hydrogen gas sensor 186a is positioned farther upstream in the first ventilation flow path 182. The first hydrogen gas sensor 186a is provided inside the first cover 116 to be adjacent to the first inlet blowing section 114 on the downstream side thereof. The second hydrogen gas sensor 186b is positioned farthest downstream in the first ventilation flow path 182. The second hydrogen gas sensor 186b is provided in the water electrolysis housing section 134 to be adjacent to the first outlet blowing section 148 on the upstream side thereof. Signals of the first hydrogen gas sensor 186a and the second hydrogen gas sensor 186b are output to the safety device 14.

The third hydrogen gas sensor 186c and the fourth hydrogen gas sensor 186d are used to detect hydrogen gas that has leaked into the second ventilation flow path 184. The third hydrogen gas sensor 186c is positioned farthest upstream in the second ventilation flow path 184. The third hydrogen gas sensor 186c is provided inside the second cover 168 to be adjacent to the second inlet blowing section 166 on the downstream side thereof. The fourth hydrogen gas sensor 186d is positioned farthest downstream in the second ventilation flow path 184. The fourth hydrogen gas sensor 186d is provided in the supply housing section 154 (third supply housing section 160) to be adjacent to the second outlet blowing section 180 on the upstream side thereof. Signals of the third hydrogen gas sensor 186c and the fourth hydrogen gas sensor 186d are output to the safety device 14.

In FIGS. 1 and 2, the water electrolysis system 12 includes an atmospheric temperature acquiring section (temperature sensor) 188 that acquires the atmospheric temperature. The atmospheric temperature acquiring section 188 is provided near the first air intake portion 112 and the second air intake portion 164. However, the atmospheric temperature acquiring section 188 may instead be provided at any other location.

As shown in FIG. 1, the safety device 14 is provided at a position distanced from the water electrolysis system 12. The safety device 14 includes a hydrogen gas leak determining section 190, a power supply control section 192, and a blowing control section 194. The hydrogen gas leak determining section 190 determines whether hydrogen gas has leaked into the first ventilation flow path 182, based on the output signals of the first hydrogen gas sensor 186a and the second hydrogen gas sensor 186b. The hydrogen gas leak determining section 190 determines whether hydrogen gas has leaked into the second ventilation flow path 184 based on the output signal of the third hydrogen gas sensor 186c and the fourth hydrogen gas sensor 186d.

The power supply control section 192 supplies power from the safety device 14 to the electrical equipment apparatus 22. The power supply control section 192 cuts off the power supply to the electrical equipment apparatus 22 when it is determined by the hydrogen gas leak determining section 190 that hydrogen gas has leaked into the first ventilation flow path 182. In this way, even if the hydrogen gas leaked into the first ventilation flow path 182 is guided to the electrical equipment chamber 104, the hydrogen gas is not ignited by the electrical equipment apparatus 22. The power supply control section 192 may also cut off the power supply to the electrical equipment apparatus 22 if it is determined by the hydrogen gas leak determining section 190 that hydrogen gas has leaked into the second ventilation flow path 184. In this case, it is possible to prevent ignition of the hydrogen due to the electrical equipment apparatus 22 with even more certainty.

When the power supply from the safety device 14 to the electrical equipment apparatus 22 is cut off by the power supply control section 192, the driving of the first inlet blowing section 114, the first outlet blowing section 148, the second inlet blowing section 166, and the second outlet blowing section 180 is also stopped. When this occurs, if hydrogen gas has been leaking into the first ventilation flow path 182, for example, there is a possibility that the hydrogen gas leaked into the first ventilation flow path 182 would flow from the water electrolysis chamber 132 to the outside via the electrical equipment chamber 104 and the first air intake portion 112.

Therefore, after the power supply to the electrical equipment apparatus 22 is cut off due to a hydrogen gas leak, the power supply control section 192 resumes the power supply to the electrical equipment apparatus 22 when the hydrogen gas leak determining section 190 determines that hydrogen gas is not leaking into the first ventilation flow path 182. In this way, the power supply is resumed when hydrogen gas is not detected by both of the output signals from the first hydrogen gas sensor 186a and the second hydrogen gas sensor 186b, the power supply is resumed, and therefore the hydrogen gas is not ignited by the electrical equipment apparatus 22.

The blowing control section 194 controls the driving of each of the first inlet blowing section 114, the first outlet blowing section 148, the second inlet blowing section 166, and the second outlet blowing section 180. The blowing control section 194 controls the blowing amount of each of the first inlet blowing section 114, the first outlet blowing section 148, the second inlet blowing section 166, and the second outlet blowing section 180, based on the atmospheric temperature acquired by the atmospheric temperature acquiring section 188. Specifically, the blowing control section 194 causes the blowing amount of each of the first inlet blowing section 114, the first outlet blowing section 148, the second inlet blowing section 166, and the second outlet blowing section 180 to be greater as the atmospheric temperature becomes higher.

The hydrogen production apparatus 10 configured in this manner operates as described below.

Due to the effect of the circulation pump 58, the pure water inside the oxygen gas-liquid separator 52 is supplied to the water inlet portion 44 via the water inflow path 54. The pure water supplied to the water inlet portion 44 is distributed to the anode inlet side of each water electrolysis cell 40.

At this time, a voltage is applied to the water electrolysis stack 24 via the electrolysis power source 50 electrically connected thereto. Therefore, each water electrolysis cell 40 electrolyzes the pure water on the anode side to generate hydrogen gas ions, electrons, and oxygen. Accordingly, on the cathode side, the hydrogen gas ions bond with the electrons to create hydrogen gas, and this hydrogen gas is extracted to the hydrogen gas outlet portion 38 along with moisture. The hydrogen gas extracted to the hydrogen gas outlet portion 38 has the moisture therein removed by the hydrogen gas-liquid separator 62 and the adsorption apparatus 66 to become dry hydrogen gas, which is then stored in the hydrogen tank 74.

In a case where the hydrogen gas stored in the hydrogen tank 74 is to be supplied to an external apparatus (not shown in the drawings), the hydrogen gas is supplied from the hydrogen tank 74 to the hydrogen gas supply path 76. The hydrogen gas flowing through the hydrogen gas supply path 76 passes through the valve unit 78, and is then supplied to the external apparatus by the dispenser 82 in a cooled state due to the precooler 80.

On the other hand, on the anode outlet side, the oxygen generated by the reaction, the unreacted water that could not be electrolyzed, and the permeated hydrogen gas flow together, and this mixed fluid is guided from the water outlet portion 46 to the upper portion of the oxygen gas-liquid separator 52 via the water discharge path 56, to be separated into liquid (water) and gas (oxygen and hydrogen gas).

The water resulting from the separation of the mixed fluid is stored in the oxygen gas-liquid separator 52 and guided to the water inflow path 54 by the effect of the circulation pump 58. The oxygen and hydrogen gas resulting from the separation of the mixed fluid are expelled to the outside from the air exhaust path 36 due to the effect of the air blower 32.

In this case, the hydrogen production apparatus 10 according to the present embodiment achieves the effects described below.

The hydrogen production apparatus 10 includes the first ventilation flow path 182 configured to cause air to flow through the electrical equipment chamber 104 and a housing chamber (water electrolysis chamber 132), which is formed by at least one of the water electrolysis chamber 132, the storage chamber 140, and the supply chamber 152, and the second ventilation flow path 184 configured to cause air to flow through at least one (supply chamber 152) of the water electrolysis chamber 132, the storage chamber 140, and the supply chamber 152, that is not part of the housing chamber (water electrolysis chamber 132). The electrical equipment chamber 104 is positioned farthest upstream in the first ventilation flow path 182, and the first ventilation flow path 182 and the second ventilation flow path 184 are separated from each other.

According to such a configuration, since the water electrolysis apparatus 16, the storage apparatus 18, the supply apparatus 20, and the electrical equipment apparatus 22 are each formed as a unit, the configuration of the hydrogen production apparatus 10 can be simplified. Furthermore, since the electrical equipment chamber 104 is positioned farthest upstream in the first ventilation flow path 182, even when hydrogen gas leaks into the first ventilation flow path 182, it is possible to prevent the leaked hydrogen gas from flowing into the electrical equipment chamber 104. Yet further, since the first ventilation flow path 182 and the second ventilation flow path 184 are separated from each other, even when hydrogen gas leaks into the second ventilation flow path 184, it is possible to prevent the leaked hydrogen gas from flowing into the electrical equipment chamber 104 of the first ventilation flow path 182. Accordingly, it is possible to prevent hydrogen gas from flowing into the electrical equipment chamber 104, with a simple and low-cost configuration.

The first ventilation flow path 182 is formed as a one-way path, and the second ventilation flow path 184 is also formed as a one-way path. According to such a configuration, it is possible to cause air to flow smoothly through the first ventilation flow path 182 and to cause air to flow smoothly through the second ventilation flow path 184.

The air outlet 130 configured to guide the air in the electrical equipment chamber 104 farther downstream (to the water electrolysis chamber 132) in the first ventilation flow path 182 from the electrical equipment chamber 104, is formed in the lower portion of the electrical equipment housing section 106. According to such a configuration, it is possible to prevent the hydrogen gas from flowing into the electrical equipment chamber 104 from a position downstream of the electrical equipment chamber 104 in the first ventilation flow path 182.

The first ventilation flow path 182 causes air to flow through the electrical equipment chamber 104 and one of the water electrolysis chamber 132 and the supply chamber 152 (water electrolysis chamber 132), and the second ventilation flow path 184 causes air to flow through the other of the water electrolysis chamber 132 and the supply chamber 152

(supply chamber 152). The air that has passed through the first ventilation flow path 182 and the air that has passed through the second ventilation flow path 184 flow into the storage chamber 140, and communication holes 150 causing the storage chamber 140 and the outside to be in communication with each other are formed in the storage housing section 142.

According to such a configuration, even in the unlikely case where hydrogen gas has leaked from the storage apparatus 18, it is possible to quickly discharge the hydrogen gas leaked from the storage apparatus 18 to the outside from the communication holes 150. Therefore, it is possible to prevent the hydrogen gas leaked from the storage apparatus 18 from flowing into and filling up at least one of the first ventilation flow path 182 and the second ventilation flow path 184. Furthermore, in a case where hydrogen gas has leaked from at least one of the water electrolysis apparatus 16 and the supply apparatus 20, the leaked hydrogen gas is discharged to the outside from the first ventilation flow path 182 or the second ventilation flow path 184 via the storage chamber 140 and the communication holes 150. Therefore, it is possible to sufficiently reduce the hydrogen gas concentration of the air in the storage chamber 140.

Furthermore, air passes through one of the water electrolysis chamber 132 and the supply chamber 152 in the first ventilation flow path 182 and air passes through the other of the water electrolysis chamber 132 and the supply chamber 152 in the second ventilation flow path 184, and therefore it is possible to moderately restrict pressure loss in the first ventilation flow path 182 and the second ventilation flow path 184. In other words, it is possible for the air to flow smoothly through each of the first ventilation flow path 182 and the second ventilation flow path 184.

The storage housing section 142 extends in one direction (X-arrow direction) that is orthogonal to the up-down direction, and the electrical equipment housing section 106 is arranged to cover one end surface of the storage housing section 142. One of the water electrolysis housing section 134 and the supply housing section 154 (the supply housing section 154) is arranged to cover the other end surface of the storage housing section 142. The other of the water electrolysis housing section 134 and the supply housing section 154 (the water electrolysis housing section 134) is arranged to cover one side surface of the storage housing section 142 that is orthogonal to the up-down direction (Z-arrow direction) and the longitudinal direction (X-arrow direction) of the storage housing section.

According to such a configuration, it is possible to surround the storage housing section 142 from three directions with the electrical equipment housing section 106, the water electrolysis housing section 134, and the supply housing section 154, and therefore it is possible to protect the storage unit 100 from external shocks (collisions with vehicles or the like, building collapse due to earthquakes, and the like).

The hydrogen production apparatus 10 includes the atmospheric temperature acquiring section 188 configured to acquire the atmospheric temperature, the blowing section (first inlet blowing section 114) arranged at the air inlet (first air intake portion 112) of the first ventilation flow path 182 and configured to blow air into the first ventilation flow path 182, and the blowing control section 194 configured to control the air blowing amount of the blowing section (first inlet blowing section 114) based on the atmospheric temperature acquired by the atmospheric temperature acquiring section 188.

With such a configuration, even in a case where the air density changes due to a change in the atmospheric temperature, it is possible to efficiently ventilate the first ventilation flow path 182. Therefore, even in a case where hydrogen gas has leaked into the first ventilation flow path 182, it is possible to effectively prevent the leaked hydrogen gas from flowing into the electrical equipment chamber 104.

One of the water electrolysis chamber 132, the storage chamber 140, and the supply chamber 152 is a merging chamber (the storage chamber 140) in which the air that has flowed through the first ventilation flow path 182 and the air that has flowed through the second ventilation flow path 184 merge. With such a configuration, it is possible to reduce the concentration of the hydrogen gas guided in from the first ventilation flow path 182 and the second ventilation flow path 184 using the air in the merging chamber (storage chamber 140).

The communication holes 150 causing the merging chamber (storage chamber 140) and the outside to be in communication are formed in a wall portion forming the merging chamber (storage chamber 140). With such a configuration, it is possible to efficiently discharge the hydrogen gas in the merging chamber (storage chamber 140) to the outside through the communication holes 150.

A region (side wall portion 143) of the wall portion (of the merging chamber (storage chamber 140)) facing the communication holes 150 is provided with the first intake portion (first outlet blowing section 148) configured to take the air that has passed through the first ventilation flow path 182 into the merging chamber (storage chamber 140), and the second intake portion (second outlet blowing section 180) configured to take the air that has passed through the second ventilation flow path 184 into the merging chamber (storage chamber 140). With such a configuration, it is possible to more efficiently discharge the hydrogen gas guided in from the first ventilation flow path 182 and the second ventilation flow path 184 to the outside through the communication holes 150.

The chamber (supply chamber 152) among the water electrolysis chamber 132, the storage chamber 140, and the supply chamber 152, which forms the second ventilation flow path, is positioned adjacent to the storage chamber (water electrolysis chamber 132), with a wall portion interposed therebetween. With such a configuration, it is possible to make the hydrogen production apparatus 10 compact.

The communication holes 150 are formed in the top wall portion 147 and the side wall portion 145 of the storage housing section 142. With such a configuration, it is possible to more efficiently discharge the hydrogen gas leaked into the storage chamber 140 to the outside.

The top wall portion 147 and the side wall portion 145 of the storage housing section 142 are punched metal. According to such a configuration, it is possible to form the plurality of communication holes 150 in the top wall portion 147 and the side wall portion 145 of the storage housing section 142 with a simple configuration.

The present invention is not limited to the configuration described above.

The blowing control section 194 may control the blowing amount of the first inlet blowing section 114 based on the hydrogen pressure acquired by the first hydrogen pressure acquiring section P1 and control the blowing amount of the second inlet blowing section 166 based on the hydrogen pressure acquired by the second hydrogen pressure acquiring section P2.

In this case, the hydrogen production apparatus 10 includes the first hydrogen pressure acquiring section P1 configured to acquire the hydrogen pressure inside an apparatus (water electrolysis apparatus 16) among the water electrolysis apparatus 16, the storage apparatus 18, and the supply apparatus 20, which is provided in the first ventilation flow path 182, and the second hydrogen pressure acquiring section P2 configured to acquire the hydrogen pressure inside an apparatus (supply apparatus 20) among the water electrolysis apparatus 16, the storage apparatus 18, and the supply apparatus 20, which is provided in the second ventilation flow path 184.

The hydrogen production apparatus 10 may include the first blowing section (first inlet blowing section 114) arranged at the air inlet (first air intake portion 112) of the first ventilation flow path 182 and configured to blow air into the first ventilation flow path 182, the second blowing section (second inlet blowing section 166) arranged at the air inlet (second air intake portion 164) of the second ventilation flow path 184 and configured to blow air into the second ventilation flow path 184, and the blowing control section 194 configured to control the blowing amount of the first blowing section (first inlet blowing section 114) based on the hydrogen pressure acquired by the first hydrogen pressure acquiring section P1 and control the blowing amount of the second blowing section (second inlet blowing section 166) based on the hydrogen pressure acquired by the second hydrogen pressure acquiring section P2.

The total molecular weight of the hydrogen gas is determined from the volume of the hydrogen gas flow path and the pressure of the hydrogen passing through this hydrogen gas flow path. Therefore, by controlling the blowing amount of the first blowing section (first inlet blowing section 114) based on the hydrogen pressure acquired by the first hydrogen pressure acquiring section P1, it is possible to cause air with a blowing amount corresponding to the hydrogen gas leaked into the first ventilation flow path 182 to flow through the first ventilation flow path 182. Furthermore, by controlling the blowing amount of the second blowing section (second inlet blowing section 166) based on the hydrogen pressure acquired by the second hydrogen pressure acquiring section P2, it is possible to cause air with a blowing amount corresponding to the hydrogen gas leaked into the second ventilation flow path 184 to flow through the second ventilation flow path 184.

In the hydrogen production apparatus 10, the arrangement of the electrical equipment unit 96, the water electrolysis unit 98, the storage unit 100, and the supply unit 102 can be freely set. For example, the arrangement positions of the electrical equipment unit 96 and the water electrolysis unit 98 may be switched.

Furthermore, the portion of the first ventilation flow path 182 on the downstream side of the electrical equipment chamber 104 may be set such that the air flows through at least one of the water electrolysis chamber 132, the storage chamber 140, and the supply chamber 152 in any order. Yet further, the second ventilation flow path 184 may be set such that air flows through at least one of the water electrolysis chamber 132, the storage chamber 140, and the supply chamber 152 that does not form a portion of the first ventilation flow path 182.

In other words, as an example, the first ventilation flow path 182 may be formed such that the air passes through the electrical equipment chamber 104, the storage chamber 140, and the supply chamber 152 in the stated order, and the second ventilation flow path 184 may be formed such that the air passes through only the water electrolysis chamber 132.

The hydrogen production apparatus according to the present invention is not limited to the embodiments described above, and it is a matter of course that various configurations can be adopted without deviating from the intended scope of the present invention.

What is claimed is:
1. A hydrogen production apparatus comprising:
   a water electrolysis unit including a water electrolysis apparatus configured to electrolyze water to generate hydrogen gas and a water electrolysis housing section that forms a water electrolysis chamber in which the water electrolysis apparatus is housed;
   a storage unit including a storage apparatus configured to store the hydrogen gas generated by the water electrolysis apparatus and a storage housing section that forms a storage chamber in which the storage apparatus is housed;
   a supply unit including a supply apparatus configured to supply the hydrogen gas stored in the storage apparatus to outside and a supply housing section that forms a supply chamber in which the supply apparatus is housed;
   an electrical equipment unit including an electrical equipment apparatus configured to control at least the water electrolysis apparatus and an electrical equipment housing section that forms an electrical equipment chamber in which the electrical equipment apparatus is housed;
   a first ventilation flow path configured to cause air to flow through the electrical equipment chamber and a housing chamber, which is formed by at least one of the water electrolysis chamber, the storage chamber, and the supply chamber; and
   a second ventilation flow path configured to cause air to flow through at least one of the water electrolysis chamber, the storage chamber, and the supply chamber that is not part of the housing chamber,
   wherein the electrical equipment chamber is positioned farthest upstream in the first ventilation flow path, and
   the first ventilation flow path and the second ventilation flow path are separated from each other.

2. The hydrogen production apparatus according to claim 1, wherein the first ventilation flow path is formed as a one-way path, and
   the second ventilation flow path is formed as a one-way path.

3. The hydrogen production apparatus according to claim 2, wherein an air outlet configured to guide the air in the electrical equipment chamber farther downstream in the first ventilation flow path from the electrical equipment chamber, is formed in a lower portion of the electrical equipment housing section.

4. The hydrogen production apparatus according to claim 1,
   wherein the first ventilation flow path causes air to flow through the electrical equipment chamber and one of the water electrolysis chamber and the supply chamber,
   the second ventilation flow path causes air to flow through another of the water electrolysis chamber and the supply chamber,
   the air that has passed through the first ventilation flow path and the air that has passed through the second ventilation flow path flow into the storage chamber, and
   a communication hole causing the storage chamber and the outside to be in communication with each other is formed in the storage housing section.

5. The hydrogen production apparatus according to claim 4, wherein
   the storage housing section extends in one direction that is orthogonal to an up-down direction, the electrical equipment housing section is arranged to cover one end surface of the storage housing section, one of the water electrolysis housing section and the supply housing section is arranged to cover another end surface of the storage housing section, and the other of the water electrolysis housing section and the supply housing section is arranged to cover one side surface of the storage housing section that is orthogonal to the up-down direction and a longitudinal direction of the storage housing section.

6. The hydrogen production apparatus according to claim 1, comprising:

an atmospheric temperature acquiring section configured to acquire an atmospheric temperature;

a blowing section arranged at an air inlet of the first ventilation flow path and configured to blow air into the first ventilation flow path; and a blowing control section configured to control an air blowing amount of the blowing section based on the atmospheric temperature acquired by the atmospheric temperature acquiring section.

7. The hydrogen production apparatus according to claim 1, comprising:

a first hydrogen pressure acquiring section configured to acquire hydrogen pressure inside an apparatus among the water electrolysis apparatus, the storage apparatus, and the supply apparatus, which is provided in the first ventilation flow path;

a second hydrogen pressure acquiring section configured to acquire hydrogen pressure inside an apparatus among the water electrolysis apparatus, the storage apparatus, and the supply apparatus, which is provided in the second ventilation flow path;

a first blowing section arranged at an air inlet of the first ventilation flow path and configured to blow air into the first ventilation flow path;

a second blowing section arranged at an air inlet of the second ventilation flow path and configured to blow air into the second ventilation flow path; and a blowing control section configured to control a blowing amount of the first blowing section based on the hydrogen pressure acquired by the first hydrogen pressure acquiring section and control a blowing amount of the second blowing section based on the hydrogen pressure acquired by the second hydrogen pressure acquiring section.

8. The hydrogen production apparatus according to claim 1, wherein one of the water electrolysis chamber, the storage chamber, and the supply chamber is a merging chamber in which the air that has flowed through the first ventilation flow path and the air that has flowed through the second ventilation flow path merge.

9. The hydrogen production apparatus according to claim 8, wherein a communication hole causing the merging chamber and the outside to be in communication is formed in a wall portion forming the merging chamber.

10. The hydrogen production apparatus according to claim 9, wherein a region of the wall portion facing the communication hole is provided with:

a first intake portion configured to take the air that has passed through the first ventilation path into the merging chamber; and a second intake portion configured to take the air that has passed through the second ventilation path into the merging chamber.

11. The hydrogen production apparatus according to claim 10, wherein a chamber among the water electrolysis chamber, the storage chamber, and the supply chamber, which forms the second ventilation flow path, is positioned adjacent to the storage chamber with a wall portion interposed therebetween.

12. The hydrogen production apparatus according to claim 4, wherein the communication hole is formed in a top wall portion and a side wall portion of the storage housing section.

13. The hydrogen production apparatus according to claim 12, wherein the top wall portion and the side wall portion of the storage housing section are punched metal.

* * * * *